(12) United States Patent
Branson et al.

(10) Patent No.: US 7,543,966 B2
(45) Date of Patent: Jun. 9, 2009

(54) ILLUMINATION SYSTEM FOR ILLUMINATING A SCAN REGION ON AN OBJECT

(75) Inventors: David E. Branson, Fort Collins, CO (US); David W. Boyd, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1375 days.

(21) Appl. No.: 10/002,574

(22) Filed: Nov. 14, 2001

(65) Prior Publication Data

US 2003/0090749 A1  May 15, 2003

(51) Int. Cl.
  *F21V 7/04* (2006.01)
(52) U.S. Cl. .................................... 362/346; 362/297
(58) Field of Classification Search ................ 362/346, 362/580, 296, 297; D14/420, 424, 421
  See application file for complete search history.

(56) References Cited

U.S. PATENT DOCUMENTS

| | | | |
|---|---|---|---|
| 4,460,939 A | 7/1984 | Murakami et al. ............ 362/31 |
| 4,868,383 A | 9/1989 | Kurtz et al. |
| 4,922,392 A * | 5/1990 | Egami et al. ................. 362/217 |
| 5,103,385 A * | 4/1992 | Federico et al. ............. 362/298 |
| 5,194,725 A | 3/1993 | Sawase et al. |
| 5,519,513 A | 5/1996 | Copenhaver et al. |
| 5,523,562 A | 6/1996 | Maple ......................... 250/235 |
| 5,552,597 A | 9/1996 | McConica ................... 250/234 |
| 5,586,212 A | 12/1996 | McConica et al. .......... 385/146 |
| 5,780,840 A | 7/1998 | Lee et al. |
| 5,921,666 A * | 7/1999 | Preston et al. ............... 362/341 |
| 5,995,243 A | 11/1999 | Kerschner et al. ........... 358/461 |
| 6,033,086 A | 3/2000 | Bohn ........................... 362/235 |
| 6,186,649 B1 * | 2/2001 | Zou et al. ..................... 362/347 |
| 6,229,137 B1 | 5/2001 | Bohn ........................... 250/234 |
| 6,249,368 B1 * | 6/2001 | Hsu ............................. 359/212 |
| 6,550,942 B1 * | 4/2003 | Zou et al. ..................... 362/347 |
| 6,607,794 B1 * | 8/2003 | Wilson et al. ............... 428/34.1 |
| 6,616,307 B2 * | 9/2003 | Haenen et al. .............. 362/341 |
| 6,953,263 B1 * | 10/2005 | Fujimoto et al. ............ 362/227 |
| 2003/0063461 A1 * | 4/2003 | Tant ............................ 362/147 |

FOREIGN PATENT DOCUMENTS

| | | |
|---|---|---|
| EP | 0465768 A2 | 1/1992 |
| EP | 0465768 A3 | 1/1992 |
| EP | 07046374 | 2/1995 |
| EP | 08340419 | 12/1996 |
| EP | 0817280 A2 | 1/1998 |

* cited by examiner

*Primary Examiner*—Jong-Suk (James) Lee
*Assistant Examiner*—Leah S Lovell

(57) ABSTRACT

An illumination system for illuminating a scan region on an object may comprise a hollow reflector having an interior reflective surface and an exit aperture. A light source positioned within the hollow reflector produces a plurality of light rays, some of which are reflected by the interior reflective surface of the hollow reflector before passing through the exit aperture. First and second reflectors positioned adjacent respective first and second sides of the exit aperture of the hollow reflector at least partially collimate light passing through the exit aperture of the hollow reflector to form a collimated beam.

20 Claims, 5 Drawing Sheets

ILLUMINATION SYSTEM FOR ILLUMINATING A SCAN REGION ON AN OBJECT

FIELD OF INVENTION

This invention relates to optical scanners in general and more specifically to a light source assembly having improved illumination.

BACKGROUND

Optical scanners are well-known in the art and produce machine-readable data which are representative of a scanned object, e.g. a page of printed text. A typical optical scanner device, such as a flatbed scanner, includes illumination and optical systems to accomplish scanning of the object. The illumination system illuminates a portion of the object (commonly referred to as a "scan region"), whereas the optical system collects light reflected by the illuminated scan region and focuses a small area of the illuminated scan region (commonly referred to as a "scan line") onto the surface of a photosensitive detector positioned within the scanner. Image data representative of the entire object then may be obtained by sweeping the scan line across the entire object, usually by moving the illumination and optical systems with respect to the object. By way of example, the illumination system may include a light source (e.g., a fluorescent or incandescent lamp or an array of light emitting diodes (LEDs)). The optical system may include a lens and/or mirror assembly to focus the image of the illuminated scan line onto the surface of the detector. Alternatively, a "contact image sensor" (CIS) may be used to collect and focus light from the illuminated scan region onto the detector.

The photosensitive detector used to detect the image light focused thereon by the optical system may be a charge-coupled device (CCD), although other devices may be used. A typical CCD may comprise an array of individual cells or "pixels," each of which collects or builds-up an electrical charge in response to exposure to light. Since the quantity of the accumulated electrical charge in any given cell or pixel is related to the intensity and duration of the light exposure, a CCD may be used to detect light and dark spots of an image focused thereon.

The term "image light" as used herein refers to the light that is focused onto the surface of the detector array by the optical system. Depending on the type of scanner and the type of document, the image light may be reflected from the document or object being scanned or it may be transmitted through the object or document. The image light may be converted into digital signals in three steps. First, each pixel in the CCD detector converts the light it receives into an electric charge. Second, the charges from the pixels are converted into analog voltages by an analog amplifier. Finally, the analog voltages are digitized by an analog-to-digital (A/D) converter. The digital signals then may be processed and/or stored as desired.

While optical scanners of the type described above are well-known and have been used for years, they are not without their problems. For example, the quality of the image data produced by a scanner is usually related to the quality of the illumination that is provided to the scan region. If the illumination is not sufficiently bright, the result may be excessive noise in the image data which may manifest itself as "snow." Other problems may appear if the level of illumination is not substantially uniform along the length of the scan line. In such cases, the resulting image data may be of variable quality along the length of the scan line. Extreme variations of illumination may even result in "drop outs" in the image data.

Still other problems may develop if the illumination system is to be used with a battery-powered (e.g., portable) image scanner. For example, in order to minimize the power drain on the battery, most portable image scanners are designed to provide the minimum amount of illumination commensurate with good image quality. Unfortunately, however, such low power illumination systems provide little margin against illumination variations. Consequently, even slight variations in illumination may well result in portions of the scan line being insufficiently illuminated. Another problem with many illumination systems is that only a small fraction of the light produced by the light source is used to illuminate the scan region.

SUMMARY OF THE INVENTION

An illumination system for illuminating a scan region on an object may comprise a hollow reflector having an interior reflective surface and an exit aperture. A light source positioned within the hollow reflector produces a plurality of light rays, some of which are reflected by the interior reflective surface of the hollow reflector before passing through the exit aperture. First and second reflectors are positioned adjacent respective first and second sides of the exit aperture of the hollow reflector. The first and second reflectors are positioned in non-parallel, spaced-apart relation to one another so that the first and second reflectors at least partially collimate light passing through the exit aperture of the hollow reflector to form a collimated beam.

Also disclosed is a method for illuminating a scan region on an object that comprises the steps of: Providing a hollow reflector having an interior reflecting surface and an exit aperture; positioning a collimating reflector adjacent the exit aperture of the hollow reflector; and directing a plurality of light rays onto the interior reflecting surface of the hollow reflector, the interior reflecting surface reflecting some of the light rays through the exit aperture in the hollow reflector, the collimating reflector at least partially collimating light exiting the exit aperture in the hollow reflector to form a collimated beam.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
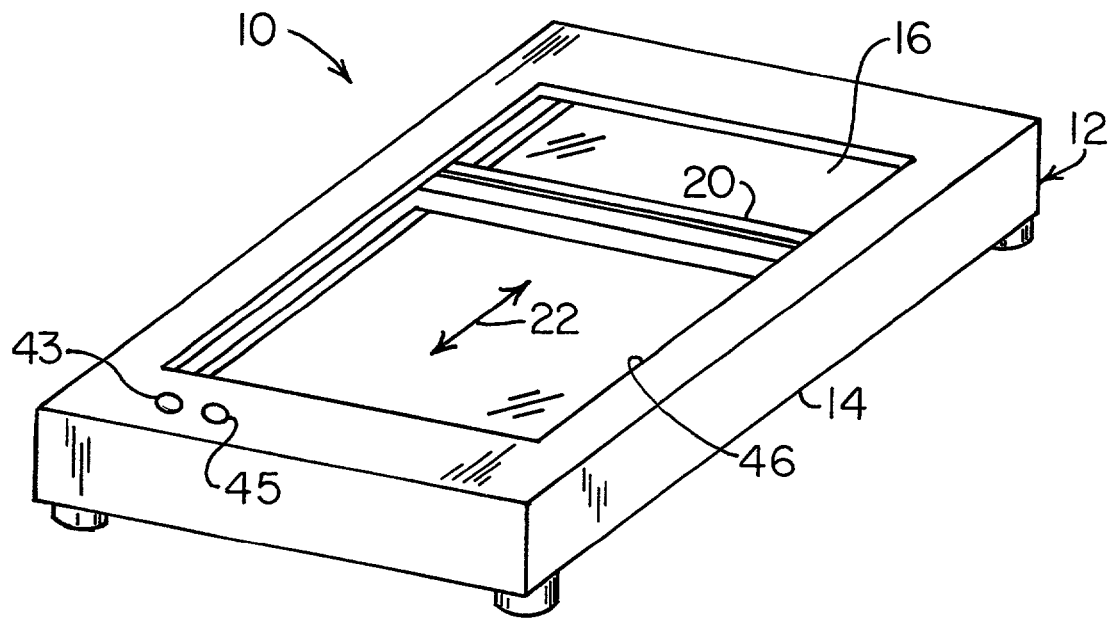
FIG. 1 is a perspective view of a scanner that may utilize the illumination system according to the present invention.

An illumination system 10 according to the present invention is shown and described herein as it may be used in conjunction with a scanner device 12 of the type well-known in the art. As will be described in greater detail below, the illumination system 10 provides for improved illumination of an object 18 (FIG. 4) being scanned by the scanner 12.

The scanner device 12 that may be used in conjunction with one embodiment of the illumination system 10 may comprise a generally rectangularly shaped housing 14 having a transparent platen 16 provided thereon. The transparent platen 16 allows the object 18 (FIG. 4), such as a sheet of paper having written text or graphics provided thereon, positioned on the transparent platen 16 to be scanned by an imaging device (not shown) provided within the housing 14 of the scanner device 12. The scanner device 12 produces electronic image data signals (not shown) that are representative of the scanned object 18. In one preferred embodiment, the illumination system 10 is mounted to a carriage assembly 20 that is moveably mounted within the housing 14. The arrangement is such that the carriage assembly 20, thus illumination system 10, is moveable back and forth underneath the transparent platen 16, generally along a displacement path 22. A carriage drive system (not shown) operatively associated with the carriage assembly 20 moves the carriage assembly 20 back and forth underneath the transparent platen 16 (i.e., along the displacement path 22) to allow the imaging device (not shown) associated with the scanner device 12 to scan the object 18 positioned on the transparent platen 16.

Figure 2:
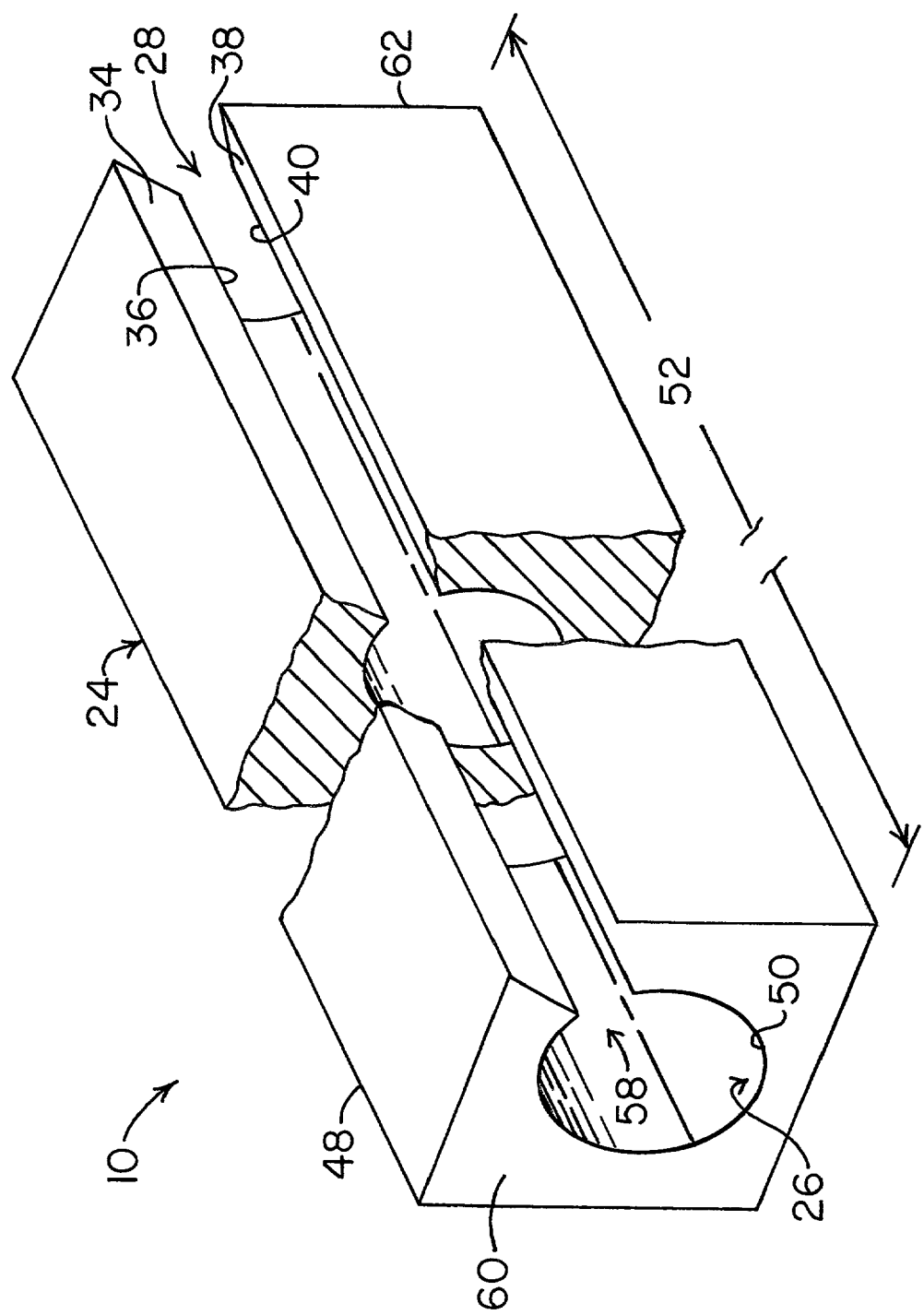
FIG. 2 is a perspective view of one embodiment of an illumination system according to the present invention with the light source removed to more clearly show the interior reflective surface and first and second collimating reflectors.
Figure 3:
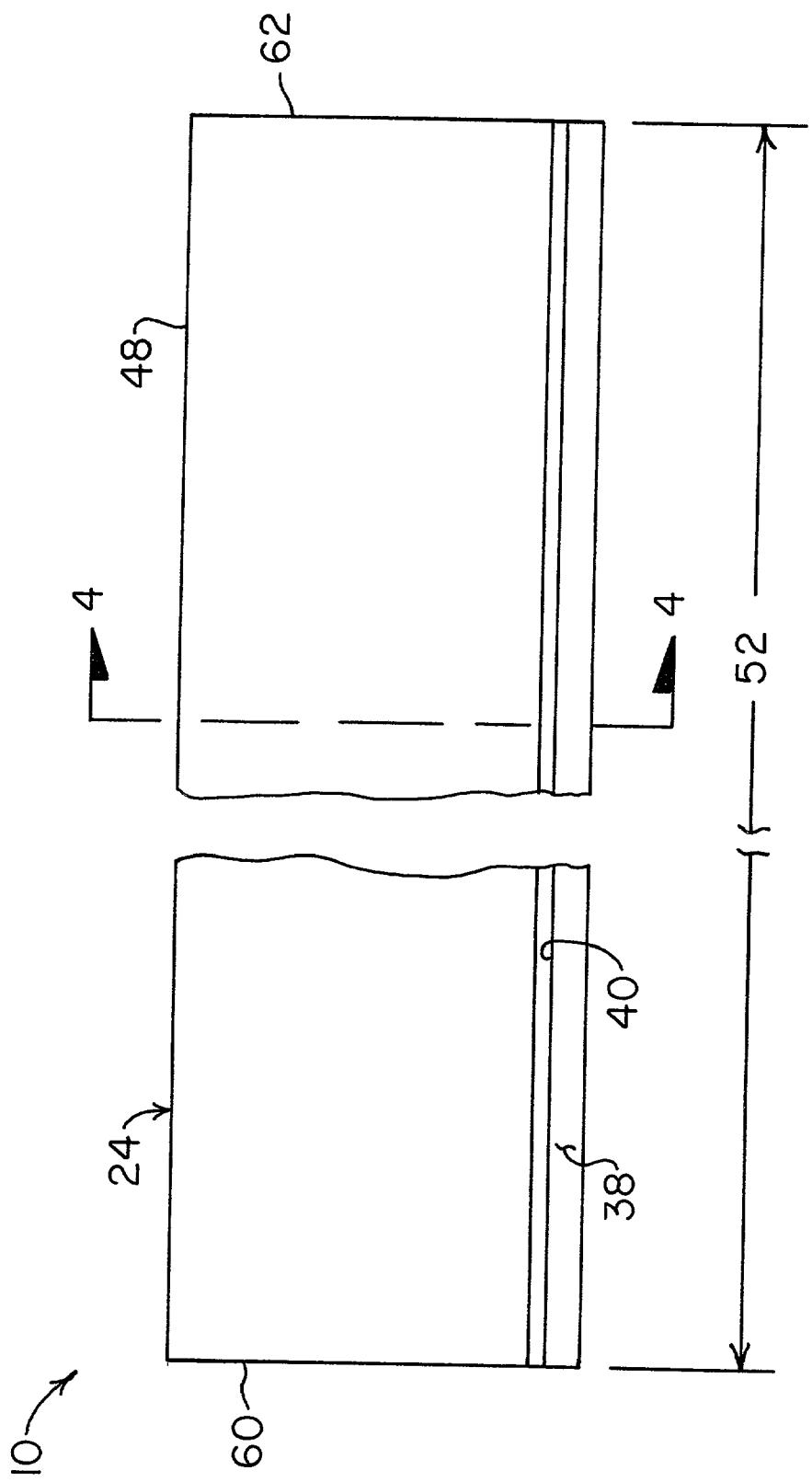
FIG. 3 is a plan view of the illumination system illustrated in FIG. 2.
Figure 4:
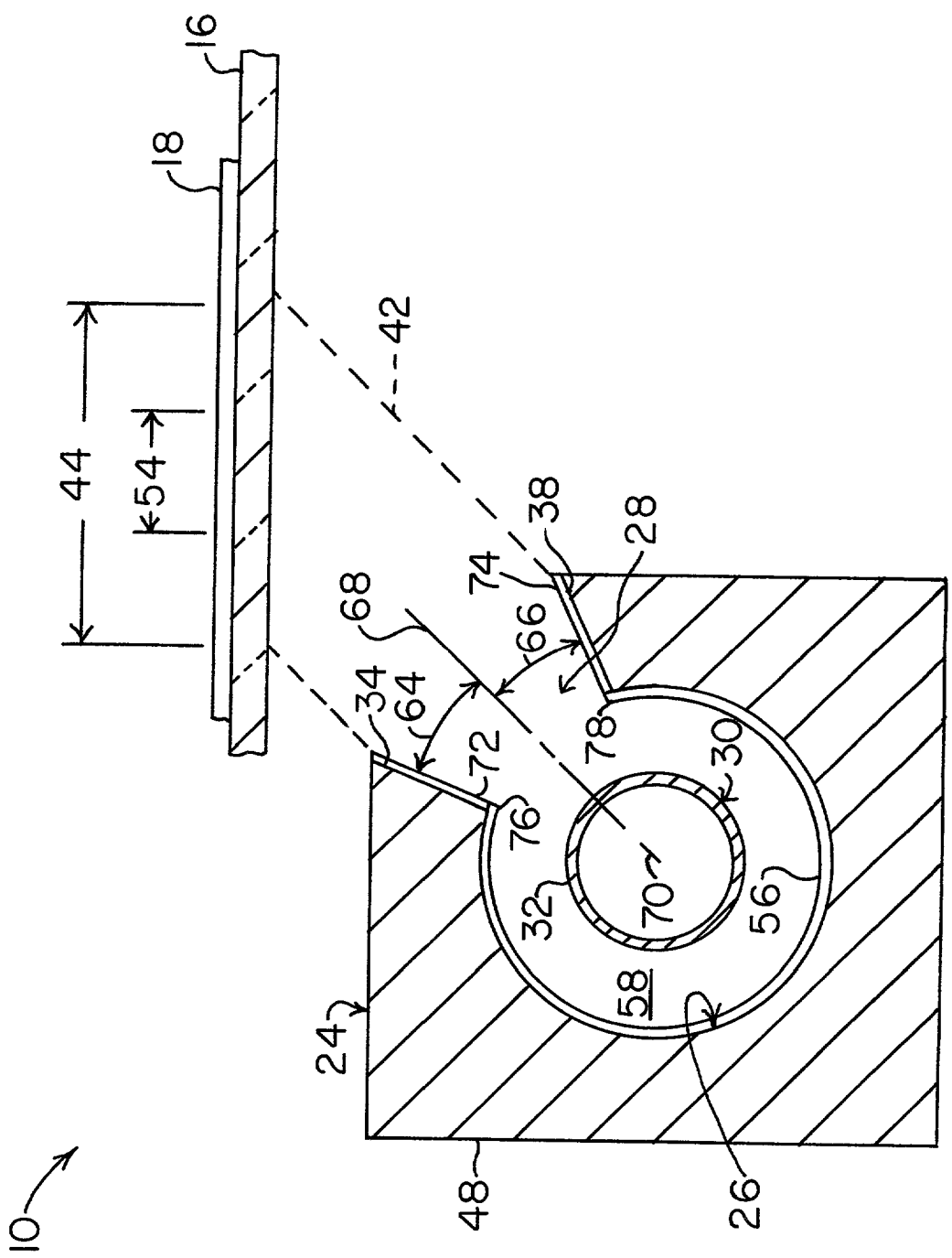
FIG. 4 is a cross-sectional view in elevation of the illumination system taken along the line 4-4 of FIG. 3.

With reference now primarily to FIGS. 2-4, the illumination system 10 according to the present invention may comprise a hollow reflector 24 having an interior reflective surface 26 and an exit aperture 28. As will be described in greater detail below, it is generally preferred that the interior reflective surface 26 comprise a diffusing reflective surface so that light incident thereon is scattered or diffused over a wide angle. A light source 30, such as a fluorescent lamp 32, is positioned within the hollow reflector 24 in the manner best seen in FIG. 4. The illumination system 10 also comprises a first reflector 34 positioned adjacent a first side 36 of the exit aperture 28 of the hollow reflector 24. A second reflector 38 is positioned adjacent a second side 40 of the exit aperture 28 of the hollow reflector 24. As will be described in greater detail below, the first and second reflectors 34 and 38 comprise specular reflecting surfaces and are positioned in generally non-parallel, spaced-apart relation so that the first and second reflectors 34 and 38 at least partially collimate light passing through the exit aperture 28 to form a collimated beam 42. See FIG. 4. It should be understood that the terms "collimated" and "collimated beam" as used herein also refer to partially collimated and partially collimated beams in that a completely collimated beam is rarely produced by any real optical system.

The collimated beam 42 produced by the illumination system 10 illuminates a scan region 44 on the object 18 positioned adjacent the transparent platen 16, as is best seen in FIG. 4. The imaging system (not shown) is arranged within the scanner device 12 so that the imaging system receives image light from a scan line 54 contained within the illuminated scan region 44.

A significant advantage of the illumination system 10 according to the present invention is that it provides for improved illumination uniformity of the scan region 44, thereby generally enhancing the overall quality of the image data produced by the scanner device 12. The illumination system 10 also directs toward the scan region 44 a greater portion of the light rays produced by the light source 30. Consequently, the illumination system 10 allows a lower power light source to be used while providing the same illumination as other types of illumination systems utilizing higher power light sources.

Still other advantages are associated with the illumination system 10. For example, besides directing additional light rays toward the scan region 44, the hollow reflector 24 along with first and second reflectors 34 and 38 serve as a light baffle to reduce the amount of stray light produced by the light source 30 that may inadvertently enter the imaging system of the scanner device 12. The reduction in the amount of stray light entering the imaging system of the scanner device 12 tends to improve the quality of the resulting scanned image data. In addition to the foregoing advantages, the open exit aperture 28 of the hollow reflector 24 facilitates better cooling of the light source 30. Improved cooling can be further realized by leaving open the first and second ends 60 and 62 of the hollow reflector 24.

Having briefly described the illumination system 10, its use in a scanner device 12, as well as some of its more significant features and advantages, the various embodiments of the illumination system 10 will now be described in detail. However, before proceeding with the detailed description it should be noted that while the illumination system 10 is shown and described herein as it could be used in a flatbed scanner device 12 of the type well-known in the art, it is not limited to use with any particular type or style of imaging device. For example, the illumination system 10 could also be used in a portable or hand-held imaging or scanner device or even in a photocopier or a facsimile machine. It should also be noted that while the scanner device 12 is shown and described herein as it may be used to scan an object 18, such as a document with written text thereon, it is not limited to use with any particular type of object 18. Accordingly, the illumination system 10 according to the present invention should not be regarded as limited to the particular type of scanner device nor to the particular applications shown and described herein.

With the foregoing considerations in mind, a first embodiment 10 of the illumination system according to the present invention is shown in FIGS. 1-4 as it could be used in a scanner device 12 of the type well-known in the art. Since scanner devices are well-known in the art and represent only an illustrative example of one type of imaging device in which may be used the illumination system 10, the scanner device 12 that may be utilized with the illumination system 10 of the present invention will not be described in great detail herein. However, in order to provide a foundation for better understanding at least one application for the present invention, the scanner device 12 will be briefly described below.

In the example application shown and described herein, the scanner device 12 may include a generally rectangularly-shaped housing 14 having a central aperture or opening 46 therein that is sized to receive a transparent platen 16 suitable for receiving an object 18 to be scanned. By way of example only, the object 18 may comprise a document with written text or graphics provided thereon, although other objects may also be used. The housing 14 is also sized to receive a suitable imaging system, such as a line type scanner. For example, in the embodiment shown and described herein, the imaging system comprises a reflective line type scanner system of the type well-known in the scanner art having components that are mounted to a moveable carriage assembly 20. The moveable carriage assembly 20 is moveably mounted within the housing 14 so that the carriage assembly 20 may be moved back and forth underneath the transparent platen 16 to allow the imaging system to capture an image of the object 18 positioned on the transparent platen 16. The scanner device 12 may also be provided with other types of systems and devices, such as, for example, a control system, an image processing system, and a carriage drive system, that may be required or desired for the particular application. However, since scanner devices, such as scanner device 12, are well-known in the art, and since systems and devices typically associated with such scanner devices could be readily provided by persons having ordinary skill in the art after having become familiar with the teachings of the present invention, the various systems and devices that may be required or desired in any particular scanner utilizing the illumination system 10 according to the present invention will not be described in further detail herein.

Referring now primarily to FIGS. 2-4, a first embodiment of the illumination system 10 according to the present invention may be mounted to the carriage assembly 20 (FIG. 1) so that the illumination system 10 may be moved back and forth underneath the transparent platen 16, i.e., generally along the displacement path 22. In this way, the illumination system 10 may be used to illuminate a scan region 44 on the object 18 positioned on the transparent platen. See FIG. 4. Then, as the moveable carriage 20 is moved along the displacement path 22, the illumination system 10 illuminates those portions of the object 18 being scanned by the imaging device.

The illumination system 10 comprises a hollow reflector 24 which, in one preferred embodiment, may comprise a generally elongate body 48 having an interior wall 50 therein which defines the interior reflective surface 26 of the hollow reflector 24. It is generally preferred, but not required, that the interior wall 50 define a substantially cylindrically shaped surface. Accordingly, the interior reflective surface 26 formed by the interior wall 50 will have a substantially circular cross-section and a length 52. It is generally preferred that the length 52 of the elongate body 48 be substantially co-extensive with the length of the scan line 54 contained within the illuminated scan region 44.

The interior wall 50 of elongate body 48 is provided with an axially-oriented opening or slot therein that defines the exit aperture 28. As will be described in greater detail below, the particular location (i.e., radial position) of the axially-oriented opening or slot should be selected so that the at least partially collimated beam 42 produced by the illumination system 10 will be directed to the appropriate location on the object 18. The arc subtended by the axially-oriented slot that defines the exit aperture 28 should be selected so that a substantial portion of the light produced by the light source 30 and reflected by the interior reflecting surface 26 will ultimately traverse the exit aperture 28 before being absorbed by components and materials contained within the interior 58 of the hollow reflector 24. By way of example, in one preferred embodiment wherein the interior reflecting surface 26 has a generally circular cross-section, the arc subtended by the axially-oriented slot may be in the range of about 15° to about 50° (31° preferred). Alternatively, other angles may be used depending on the requirements of the particular application, as would be obvious to persons having ordinary skill in the art after having become familiar with the teachings of the present invention.

It is generally preferred that the exit aperture 28 of hollow reflector 24 remain open to facilitate the flow of air around the light source 30, thus assist in the cooling of the light source 30. This cooling capability can be enhanced by leaving open the ends 60 and 62 (FIGS. 2 and 3) of the elongate body 48 that defines the hollow reflector 24. The open ends 60 and 62 provide an inlet for air to enter the interior region 58 of hollow reflector 24. After absorbing heat from the light source 30, the air will generally be discharged through the open exit aperture 28 in accordance with well-known thermal convection principles. Alternatively, semi-closed ends, such as may be achieved by covering each end 60, 62 of body 48 with a louvered or perforated cover (not shown), may also be used. In still another arrangement, air inlet holes may be provided along the length of the interior wall 50. However, this arrangement will be generally less desirable than leaving open the ends 60 and 62, since holes or openings along the length of the interior wall 50 will generally reduce the amount of light available to illuminate the scan region 44.

The generally elongate body 48 comprising the hollow reflector 24 may be fabricated from any of a wide range of materials, such as metals or plastics, that would be suitable for the intended application. Consequently, the present invention should not be regarded as limited to an elongate body 48 comprising any particular material. However, by way of example, in one preferred embodiment, the elongate body 48 is fabricated from aluminum.

The light source 30 may comprise any of a wide variety of light sources that are currently available or that may be developed in the future for producing light along the length 52 of the hollow reflector 24. By way of example, in one preferred embodiment, the light source 30 may comprise a fluorescent lamp 32 of the type that are well-known in the art for such applications and that are readily and commercially available. Alternatively, other types of light sources, such as incandescent lamps, may also be used.

As discussed above, it is generally preferred that the interior reflective surface 26 of elongate body 48 comprise a diffusing reflective surface that, while reflecting a substantial amount of light incident thereon, also scatters or diffuses the incident light. The scattering provided by the diffusing reflective surface 26 improves the uniformity of the illumination along the length 52 of the hollow reflector 24 and also helps to smooth intensity variations that may occur along the length of the light source 30.

Depending on the nature of the material comprising the interior wall 50 of the body 48, it may be necessary or desirable to provide a diffusing reflecting coating 56 on the interior reflective surface 26 of hollow reflector 24. For example, in one preferred embodiment wherein the body 48 of hollow reflector 24 comprises aluminum (which naturally provides a generally specular reflective surface), it will be generally preferable to coat the interior wall 50 with a material (e.g., coating 56) that provides the diffuse reflecting characteristic described herein. Alternatively, the interior surface 26 could be roughened (e.g., etched) to provide the diffuse reflecting characteristic. By way of example, in one preferred embodiment, the diffuse reflecting characteristic is achieved by painting (i.e., coating) the interior wall 50 of the aluminum body 48 with white paint having a high reflectivity. As is known, many white paints are known that have high reflectivities (e.g., in the range of 80% to 90% for visible light). In addition, highly reflective materials having reflectivities as high as about 95%-98% are known and may be used. An example of such a highly reflective material is available from the Electronic Products Division of W. L. Gore, Inc., under the name "DRP." Such high reflectivities typically surpass the reflectivities of even highly polished specular reflecting surfaces (e.g., mirrors), thereby improving the efficiency and performance of the illumination system 10. Of course, still other highly reflective coatings are known and may be used which provide the diffuse reflecting characteristics described herein, as would be obvious to persons having ordinary skill in the art after having become familiar with the teachings of the present invention. Consequently the present invention should not be regarded as limited to the particular materials and coatings described herein to provide the internal reflective surface 26 with the diffuse reflecting characteristics.

The illumination system 10 may also comprise first and second reflectors 34 and 38 positioned adjacent the exit aperture 28 of the hollow reflector 24. The first and second reflectors 34 and 38 at least partially collimate light passing through the exit aperture 28 to form the collimated beam 42. Referring now primarily to FIGS. 3 and 4, the first reflector 34 is positioned adjacent the first side 36 of the exit aperture 28 of the hollow reflector 24. The second reflector 38 is positioned adjacent the second side 40 of the exit aperture 28. The first and second reflectors 34 and 38 may comprise generally planar surfaces that are positioned in generally non-parallel, spaced-apart diverging relation so that they substantially collimate light emerging from the exit aperture 28 of hollow reflector 24.

In accordance with their use to collimate, or at least partially collimate, the light emerging from the exit aperture 28 of hollow reflector 24, it is generally preferred that both the first and second reflectors 34 and 38 comprise specular reflective surfaces (as opposed to the diffuse reflective surface provided on the interior reflective surface 26 of hollow reflector 24). It is also generally preferred that both the first and second reflectors 34 and 38 comprise substantially planar (i.e., flat) surfaces, although this is not required.

In accordance with the foregoing considerations, then, in one preferred embodiment wherein the body 48 is fabricated from aluminum, each reflector 34 and 38 comprises a substantially flat or planar surface of the body 48. That is, the body 48 is suitably formed so that it comprises both the interior reflective surface 26 of the hollow reflector 24 as well as the first and second reflectors 34 and 38. It is generally preferred that the flat surfaces of body 48 that form the first and second reflectors 34 and 38 comprise specular reflecting surfaces. Such specular reflecting surfaces allow the first and second reflectors 34 and 38 to collimate the light emerging from the exit aperture 28, thus forming collimated beam 42.

The specular reflecting characteristics to be provided by the first and second reflectors 34 and 38 may be accomplished in any of a wide variety of ways. For example, in one preferred embodiment wherein the elongate body 48 is fabricated from aluminum and wherein the first and second reflectors 34 and 38 comprise integral portions of the elongate body 48, the first and second reflectors 34 and 38 may comprise the natural finish of the aluminum material. Depending on the smoothness (i.e., surface finish) achieved during fabrication of the elongate body 48 it may be necessary or at least desirable to polish the first and second reflectors 34 and 38 to increase the reflectivities of the reflectors 34 and 38. Alternatively, the first and second reflectors 34 and 38 may be coated with respective specular reflecting coatings 72 and 74 to provide the desired specular reflecting characteristic. Such specular reflective coatings could comprise any of a wide range of materials now known in the art or that may be developed in the future for providing such a specular reflecting characteristic. Examples of such coating materials include, but are not limited to, metallized mylar or any similar type of highly specularly reflective material. Alternatively, any of a wide variety of metal coatings may be deposited directly on the surfaces comprising the first and second reflectors 34 and 38 by any of wide range of suitable processes (e.g, chemical vapor deposition, sputtering, etc.). In still another configuration, glass mirrors may be affixed to the surfaces 34 and 38.

The particular shapes (e.g., planar, concave, or convex) and geometrical orientations (e.g., converging, diverging, or parallel) of the first and second reflectors 34 and 38 may be varied to provide the desired degree of collimation to the collimated beam 42. In the embodiment shown and described herein wherein the hollow reflector 24 comprises a generally cylindrical configuration, the first and second reflectors 34 and 38 may comprise planar or flat surfaces positioned in generally non-parallel, spaced-apart relation in the manner best seen in FIG. 4. The angles 64 and 66 formed between a centerline 68 of the exit aperture 28 are preferred to provide the desired degree of collimation to the collimated beam 42 as well as to direct the collimated beam 42 to the appropriate area on the object 18. As is best seen in FIG. 1, the centerline 68 of the exit aperture 28 extends between the first and second reflectors 34 and 38 and intercepts the central axis 70 of the cylindrical interior wall 50 of hollow reflector 24. By way of example in one preferred embodiment, the angles 64 and 66 are identical to one another and may be in the range of about 5° to about 20° (11° preferred), although other angles are possible.

It is generally preferred that the first and second reflectors 34 and 38 be joined to the respective first and second sides 36 and 40 of the exit aperture 28 so that respective sharp corners 76 and 78 (as opposed to a smooth or partially rounded transition) are formed between the first and second sides 36 and 40 of the exit aperture 28 and the respective first and second reflectors 34 and 38. See FIG. 4. Generally speaking, a sharp corner minimizes scattering, thus improves the collimation of the collimated beam 42. If a smooth or rounded transition is provided between the exit aperture 28 and the first and second reflectors 34 and 38, then it will be generally preferable to provide the smooth or rounded transition with a diffusing reflective surface. As discussed above for the interior reflective surface 26 of hollow reflector 24, such a diffusing reflective surface may be provided by coating the smooth or rounded transition area with white paint or other highly reflective material.

While it is possible to derive the various geometric design parameters (e.g., shapes and relative positions of the first and second collimating reflectors 34 and 38, as well as the shape and diameter of the interior wall 50 defining the interior reflective surface 26) by manual methods to achieve a workable design in any particular application, it is generally preferable to utilize any of a wide range of computer programs to assist in developing the particular parameters that will provide the desired degree of collimation of the collimated beam 42. For example, in the embodiment shown and described herein, the geometrical configuration of the illumination system 10 was optimized with the assistance of a computer program known as "Advanced System Analysis Program" (ASAP), available from Breault Research Organization of Tucson, Ariz. Briefly, this program was used to model various configurations until the collimated beam 42 was substantially collimated with minimal divergence for the particular orientation, shape, and composition of the reflectors employed. Alternatively, of course, other programs that are now available or that may be developed in the future may also be used to assist in arriving at an optimum configuration.

The illumination system 10 may be operated as follows to provide improved illumination of the scan region 44 during the scanning process. As a first step in the process, a user (not shown) would set-up or initialize the scanner device 12 to perform the scanning operation by actuating the appropriate buttons or switches 43, 45 (FIG. 1) which may be provided on the scanner device 12 for this purpose. Of course, the need to perform such an initialization process may or may not need to be performed depending on the operating characteristics of the particular scanner device 12. Similarly, the particular steps required to perform the set-up or initialization may vary depending on the particular scanner device. Consequently, the present invention should not be regarded as limited to performing such an initialization process and/or the specific steps required to perform the process. In any event, once the scanner device 12 is ready to perform the scan operation, the user may place the desired object 18 to be scanned on the transparent platen 16 and thereafter initiate the scanning operation. During the scanning operation, the light source 30 (FIG. 4) is activated to produce light. Most of the light produced by the light source 30 is incident on the interior reflective surface 26 of the hollow reflector 24 whereupon it is reflected and diffused by the diffusing reflecting characteristic of the interior reflective surface 26. Thereafter, the reflected diffused light passes through the exit aperture 28 of hollow reflector 24. Of course, some of the light produced by the light source 30 passes directly through the exit aperture 28 and is not reflected and diffused by the interior reflective surface 26 of hollow reflector 24.

Much of the light emerging from the exit aperture 28 of the hollow reflector 24 will be reflected by the first reflector 34, the second reflector 38, or both, depending on the angle of incidence the light makes with the reflectors 34 and 38. Since the first and second reflectors 34 and 38 comprise specular reflecting surfaces, and since the reflectors 34 and 38 are carefully positioned and oriented to at least partially collimate the light passing through the exit aperture 28 of hollow reflector 24, the first and second reflectors 34 and 38 form the collimated beam 42 which illuminates the scan region 44 on the object 18 being scanned. Thereafter, the imaging device (not shown) associated with the scanner apparatus 12 captures image data (not shown) corresponding to the scan line 54 contained within the illuminated scan region 44. The entire object 18 may be scanned by moving the carriage assembly 20 along the displacement path 22 in any of a wide range of manners well-known in the art for such scanner devices.

Figure 5:
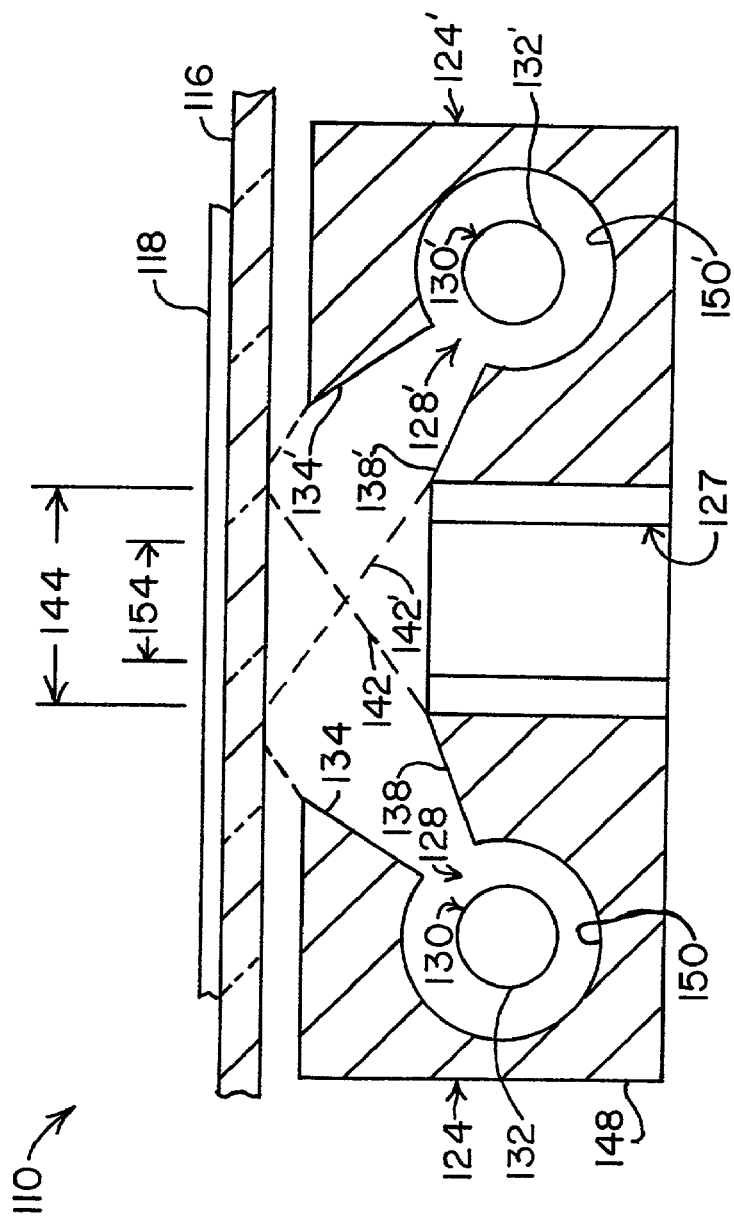
FIG. 5 is a cross-sectional view in elevation of a second embodiment of an illumination system according to the present invention.

A second embodiment 110 of the illumination system according to the present invention is illustrated in FIG. 5 and may comprise two hollow reflectors 124 and 124' positioned adjacent one another. This second embodiment may be used to provide increased illumination of the scan region 144 on an object 118 provided on transparent platen 116. Alternatively, smaller (i.e., lower power) light sources may be used to provide an equivalent amount of illumination as the first embodiment 10 described above.

The second embodiment 110 may comprise a single elongate body 148 which is shaped or formed as necessary to provide the various reflecting surfaces. For example, the body 148 may be provided with a first interior wall 150 which defines a first generally cylindrical hollow reflector 124 and a second interior wall 150' that defines the second hollow reflector 124'. The body 148 also defines first and second exit apertures 128 and 128' for each respective hollow reflector 124 and 124'. In the embodiment shown and described herein, the body 148 also defines first and second reflectors 134 and 138 for the first hollow reflector 124, as well as first and second reflectors 134' and 138' for the second hollow reflector 124'. The body 148 may be provided with an opening 127 therein positioned between the first and second hollow reflectors 124 and 124' to allow an imaging system (not shown) to image a scan line 154 contained within the illuminated scan region 144. Each hollow reflector 124 and 124' may be provided with a corresponding light source 130 and 130' which, in the embodiment shown and described herein, may comprise respective first and second fluorescent lamps 132 and 132'.

As was the case for the first embodiment, the geometric configurations of the various reflectors and elements comprising the second embodiment 110 of the illumination system are selected so that the partially collimated beams 142 and 142' are shaped and directed to illuminate the scan region 144. For example, in the second embodiment 110, the shapes and relative configurations of the various reflectors and elements were optimized with the assistance of the "Advanced System Analysis Program" (ASAP) described above for the first embodiment. The ASAP program was used to model various configurations until the collimated beams 142 and 142' were substantially collimated with minimal divergence for the particular orientation, shape, and composition of the reflectors employed.

What is claimed is:

1. An illumination system for illuminating a scan region on an object, comprising:
    a hollow reflector having an interior reflective surface and an exit aperture formed in a body of the hollow reflector;
    a light source positioned within said hollow reflector, said light source producing a plurality of light rays, some of the light rays produced by said light source being reflected by the interior reflective surface of said hollow reflector before passing through the exit aperture;
    a first reflector joined to disposed on a first side of the exit aperture of said hollow reflector; and
    a second reflector joined to disposed on a second side of the exit aperture of said hollow reflector, said first and second reflectors being positioned in non-parallel, spaced-apart relation to one another, said first and second reflectors at least partially collimating light passing through the exit aperture of said hollow reflector to form a collimated beam: wherein the hollow reflector is formed to comprise both the interior reflective surface and the first and second reflectors,
    wherein said hollow reflector moves along a displacement path to illuminate a scan region of an object that is positioned on a platen.

2. The illumination system of claim 1, wherein said hollow reflector has open ends that provide an inlet for air to enter interior regions of the hollow reflector.

3. The illumination system of claim 1, wherein the first and second reflectors comprise integral portions of the hollow reflector.

4. The illumination system of claim 1, wherein the first and second reflectors form a sharp corner at a junction with the interior reflective surface of said hollow reflector, the sharp corner minimizes scattering and improves collimation of the light rays passing through the exit aperture.

5. The illumination system of claim 1, wherein the illumination system is mounted to a carriage that moves along the displacement path to illuminate the scan region on the object.

6. The illumination system of claim 1, wherein said first reflector comprises a generally flat reflective surface.

7. The illumination system of claim 1, wherein said second reflector comprises a generally flat reflective surface.

8. The illumination system of claim 1, wherein said first and second reflectors comprise specular reflecting surfaces.

9. The illumination system of claim 1, wherein said first and second reflectors are coated with a specular reflecting material.

10. An illumination system for illuminating a scan region on an object, comprising:
    a body having an interior wall defining a generally cylindrically shaped interior reflective surface, the interior wall of said body also defining a generally elongate axial opening therein located at a first radial position on the interior wall of said body;
    a light source illuminating a scan region on an object that is positioned on a platen and being positioned within the generally cylindrically shaped interior reflective surface defined by said body;

a first reflector joined to a first side of the elongate axial opening defined by the interior wall of said body; and a second reflector joined to a second side of the elongate axial opening defined by the interior wall of said body, said first and second reflectors being positioned in non-parallel, spaced-apart relation to one another, said first and second reflectors at least partially collimating light passing through the elongate axial opening of said body to form a collimated beam; and wherein the first and second reflectors form a sharp corner at a junction with the interior reflective surface of the body, and the sharp corner minimizes scattering and improves collimation of the at least partially collimating light passing through the elongate axial opening.

11. The illumination system of claim 10, wherein the first and second reflectors comprise integral portions of the body.

12. The illumination system of claim 10, wherein said first reflector comprises a flat reflective surface.

13. The illumination system of claim 10, wherein said second reflector comprises a flat reflective surface.

14. The illumination system of claim 10, wherein a length of the body is co-extensive with a length of a scan line within the scan region.

15. The illumination system of claim 10, wherein the body is formed to comprise both the interior reflective surface and the first and second reflectors.

16. The illumination system of claim 10, wherein said first and second reflectors comprise specular reflecting surfaces.

17. The illumination system of claim 10, wherein said first and second reflectors are coated with a specular reflecting material.

18. An illumination system for illuminating a scan region on an object, comprising:

hollow reflector means for defining an interior reflecting surface and an exit aperture formed through a body of the hollow reflector means;

light source means positioned within said hollow reflector means for producing a plurality of light rays; and collimating reflector means joined to the exit aperture defined by said hollow reflector means for at least partially collimating light exiting the exit aperture defined by said hollow reflector means to form a collimated beam, wherein the hollow reflector means is integrally formed to comprise both the collimating reflector means and the interior reflecting surface, wherein said hollow reflector means moves along a displacement path to illuminate a scan region of an object that is positioned on a platen.

19. The illumination system of claim 18, wherein said collimating reflector means forms a sharp corner at a junction with the interior reflecting surface of the hollow reflector means, and the sharp corner minimizes scattering and improves collimation of the at least partially collimating light exiting through the exit aperture.

20. A method for illuminating a scan region on an object, comprising:

providing a hollow reflector having an interior reflecting surface and an exit aperture formed in a body of the hollow reflector;

integrally forming the hollow reflector with a collimating reflector on at least one side of the exit aperture of the hollow reflector and forming a junction between the collimating reflector and the interior reflecting surface;

directing a plurality of light rays onto the interior reflecting surface of the hollow reflector, the interior reflecting surface reflecting some of the light rays through the exit aperture in the hollow reflector, the collimating reflector at least partially collimating light exiting the exit aperture in the hollow reflector to form a collimated beam; and moving the hollow reflector along a displacement path to direct light exiting through the aperture to scan an object that is positioned on a transparent platen.

* * * * *